(12) United States Patent
Saida

(10) Patent No.: US 9,602,185 B2
(45) Date of Patent: Mar. 21, 2017

(54) COMMUNICATION TERMINAL, COMMUNICATION CONTROL APPARATUS, COMMUNICATION SYSTEM, COMMUNICATION CONTROL METHOD, AND PROGRAM

(71) Applicant: NEC Corporation, Minato-ku, Tokyo (JP)

(72) Inventor: Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/775,160

(22) PCT Filed: Mar. 14, 2014

(86) PCT No.: PCT/JP2014/056865
§ 371 (c)(1),
(2) Date: Sep. 11, 2015

(87) PCT Pub. No.: WO2014/056865
PCT Pub. Date: Sep. 18, 2014

(65) Prior Publication Data
US 2016/0036514 A1   Feb. 4, 2016

(30) Foreign Application Priority Data

Mar. 14, 2013   (JP) ................. 2013-051862

(51) Int. Cl.
*H04W 12/08* (2009.01)
*H04B 7/155* (2006.01)
(Continued)

(52) U.S. Cl.
CPC ............ *H04B 7/155* (2013.01); *H04M 15/28* (2013.01); *H04W 12/06* (2013.01); *H04W 12/08* (2013.01);
(Continued)

(58) Field of Classification Search
CPC ...... H04B 7/155; H04W 12/08; H04W 12/06; H04W 76/021; G06F 19/322;
(Continued)

(56) References Cited

U.S. PATENT DOCUMENTS

2009/0161597 A1* 6/2009 Madanapalli ....... H04W 76/022
                                                    370/315
2013/0201523 A1* 8/2013 Oka ..................... G06F 3/1292
                                                    358/1.15

FOREIGN PATENT DOCUMENTS

JP    2003-101565 A    4/2003
JP    2009-077031 A    4/2009
(Continued)

OTHER PUBLICATIONS

Nick McKeown and seven other authors, "OpenFlow: Enabling Innovation in Campus Networks", Mar. 2008.
(Continued)

*Primary Examiner* — Phuoc H Doan

(57) ABSTRACT

Provided a communication terminal configured to provide a tethering function controls permission of communication of a different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

20 Claims, 7 Drawing Sheets

(51) Int. Cl.
*H04W 76/02* (2009.01)
*H04M 15/28* (2006.01)
*H04W 12/06* (2009.01)
*H04W 88/04* (2009.01)
*H04W 88/06* (2009.01)

(52) U.S. Cl.
CPC ............ *H04W 76/02* (2013.01); *H04W 88/04* (2013.01); *H04W 88/06* (2013.01)

(58) Field of Classification Search
CPC ............... G06F 17/30218; H04L 63/08; H04L 61/2007; H04L 47/12; H04L 45/22; H04L 43/08; H04L 67/02; H04L 63/02
USPC ..... 455/405, 436, 522, 67.11; 370/235, 401, 370/331; 709/224; 726/13; 358/1.15
See application file for complete search history.

(56) References Cited

FOREIGN PATENT DOCUMENTS

| | | |
|---|---|---|
| JP | 2009-260783 A | 11/2009 |
| JP | 2010-045590 A | 2/2010 |
| JP | 2012-524499 A | 10/2012 |
| JP | 2012-227610 A | 11/2012 |

OTHER PUBLICATIONS

"OpenFlow Switch Specification" Version 1.1.0 Implemented (Wire Protocol 0x02), Feb. 2011.
International Search Report for PCT Application No. PCT/JP2014/056865, mailed on Jun. 17, 2014.

\* cited by examiner

FIG. 3

| EXAMPLES OF CONTROL POLICIES | | | |
|---|---|---|---|
| ATTRIBUTE OF TETHRING CHILD TERMINAL | COMMUNI-CATION DESTINATION | EXTERNAL NETWORK IF TYPE | CONTROL ACTION |
| TERMINAL SUPPLIED BY ENTERPRISE | USE LIMITED SERVER GROUP | PUBLIC Wi-Fi (WITH LOW SECURITY) | BLOCK |
| | | 3G (WITH MEDIUM SECURITY) | PERMIT |
| | | VPN CONNECTED TO USE LIMITED SERVER GROUP (WITH HIGH SECURITY) | PERMIT |
| | PUBLIC SERVER GROUP | PUBLIC Wi-Fi (WITH LOW SECURITY) | BLOCK |
| | | 3G (WITH MEDIUM SECURITY) | BLOCK |
| | | VPN CONNECTED TO USE LIMITED SERVER GROUP (WITH HIGH SECURITY) | BLOCK |
| PERSONAL TERMINAL | USE LIMITED SERVER GROUP | PUBLIC Wi-Fi (WITH LOW SECURITY) | BLOCK |
| | | 3G (WITH MEDIUM SECURITY) | BLOCK |
| | | VPN CONNECTED TO USE LIMITED SERVER GROUP (WITH HIGH SECURITY) | PERMIT |
| | PUBLIC SERVER GROUP | PUBLIC Wi-Fi (WITH LOW SECURITY) | PERMIT |
| | | 3G (WITH MEDIUM SECURITY) | PERMIT |
| | | VPN CONNECTED TO USE LIMITED SERVER GROUP (WITH HIGH SECURITY) | BLOCK |

FIG. 6

EXAMPLES OF CONTROL POLICIES

| ATTRIBUTE OF TETHRING CHILD TERMINAL | COMMUNI-CATION DESTINATION | EXTERNAL NETWORK IF TYPE | CUMULATIVE AMOUNT OF COMMUNICATION | CONTROL ACTION |
|---|---|---|---|---|
| TERMINAL SUPPLIED BY ENTERPRISE | USE LIMITED SERVER GROUP | PUBLIC Wi-Fi (WITH LOW SECURITY) | — | BLOCK |
| | | 3G (WITH MEDIUM SECURITY) | THRESHOLD VALUE OR LESS | PERMIT |
| | | | THRESHOLD VALUE OR MORE | BLOCK |
| | | VPN CONNECTED TO USE LIMITED SERVER GROUP (WITH HIGH SECURITY) | — | PERMIT |
| | PUBLIC SERVER GROUP | PUBLIC Wi-Fi (WITH LOW SECURITY) | — | BLOCK |
| | | 3G (WITH MEDIUM SECURITY) | — | BLOCK |
| | | VPN CONNECTED TO USE LIMITED SERVER GROUP (WITH HIGH SECURITY) | — | BLOCK |
| PERSONAL TERMINAL | USE LIMITED SERVER GROUP | 3G (WITH MEDIUM SECURITY) | — | BLOCK |
| | | PUBLIC Wi-Fi (WITH LOW SECURITY) | — | BLOCK |
| | | VPN CONNECTED TO USE LIMITED SERVER GROUP (WITH HIGH SECURITY) | — | PERMIT |
| | PUBLIC SERVER GROUP | PUBLIC Wi-Fi (WITH LOW SECURITY) | — | PERMIT |
| | | 3G (WITH MEDIUM SECURITY) | THRESHOLD VALUE OR LESS | PERMIT |
| | | | THRESHOLD VALUE OR MORE | BLOCK |
| | | VPN CONNECTED TO USE LIMITED SERVER GROUP (WITH HIGH SECURITY) | — | BLOCK |

COMMUNICATION TERMINAL, COMMUNICATION CONTROL APPARATUS, COMMUNICATION SYSTEM, COMMUNICATION CONTROL METHOD, AND PROGRAM

CROSS-REFERENCE TO RELATED APPLICATIONS

This is a national stage of International Application No. PCT/JP2014/056865 filed Mar. 14, 2014, claiming priority based on Japanese Patent Application No. 2013-051862 filed Mar. 14, 2013, the entire contents of which are incorporated herein by reference. The present invention relates to a communication terminal, a communication control apparatus, a communication system, a communication control method, and a program.

TECHNICAL FIELD

Background

A lot of portable terminals such as smart phones in recent years have both a function of communication using a public mobile wireless network such as 3G (3rd Generation) or LTE (Long Term Evolution) and a function of communication using a local area wireless network such as a wireless LAN (Local Area network). Among commercially available portable terminals, there is a portable terminal having a function referred to as "tethering" (tethering). By using the tethering function, the communication function of the portable terminal is provided to an apparatus (referred to as a "different apparatus") such as a PC (Personal Computer) or a game apparatus different from the portable terminal, as an external modem, thereby making it possible for the different apparatus to be connected to the Internet. A PC or a game apparatus (different apparatus) having only a function for connecting to a wireless LAN, even when a user of the PC or the game apparatus is out of the office or away from home, for example, can be connected to the Internet to perform communication,3 by using a tethering function provided by the portable terminal.

The following describe an example of connection between a portable terminal configured to provide a tethering function and a different apparatus, wherein the connection is performed by using a wireless LAN. The portable terminal configured to provide the tethering function connects to the Internet, which is an external packet network, through a mobile communication network such as 3G or LTE, and the portable terminal configured to provide the tethering function relays communication of the different apparatus, thereby making it possible for the different apparatus to connect to the Internet.

It is difficult for a server or the like arranged on the Internet, which is a communication destination of each of the portable terminal providing the tethering function and the different apparatus, to distinguish that communication to the server or the like is:

from an application running on the portable terminal providing the tethering function; or from an application running on the different apparatus utilizing the tethering function of the portable terminal.

This is because the server or the like does not include means for identifying from which one of the terminals the communication comes.

When the portable terminal having the tethering function has a right to use a service such as a fee-based service or an enterprise business service that needs a special right, the different apparatus using the tethering function of the portable terminal can therefore also use the service that needs the special right. An owner of the different apparatus may be different from an owner of the portable terminal providing the tethering function. In this case, in addition to a problem of accounting for the fee-based service provided to a subscriber (user of the portable terminal) by a carrier, there is also a problem in terms of security in a business service or the like, for example.

Regarding the tethering function of a portable terminal, Patent Literature 1, for example, discloses a configuration that makes it possible for a portable terminal having the tethering function to make access to the Internet concurrently with one or more applications of a tethering machine (different apparatus). Patent Literature 2 discloses a portable terminal configured to acquire, from a tethering terminal, condition information for a tethering process, to connect to one tethering terminal, based on the acquired condition information, and to connect the selected tethering terminal to a network. Regarding OpenFlow, reference may be made to Non Patent Literatures 1 and 2, for example.

CITATION LIST

Patent Literature

[PTL 1]
JP Patent Kohyo Publication No. JP2012-524499A
[PTL 2]
JP Patent Kokai Publication No. JP2012-227610A

Non Patent Literature

[NPL 1]
Nick McKeown and seven other authors, "OpenFlow: Enabling Innovation in Campus Networks," [online], [Searched on January 31, Heisei 25], Internet <URL: http://www.openflowswitch.org//documents/openflow-wp-latest.pdf>.
[NPL 2]
"OpenFlow Switch Specification" Version 1.1.0 Implemented (Wire Protocol 0x02), [Searched on January 31, Heisei 25], Internet <URL: http://www.openflowswitch.org/documents/openflow-spec-v1.1.0.pdf>.

SUMMARY

The following analysis of the related arts will be given below.

As mentioned above, when a portable terminal having a tethering function holds a right to use a fee-based service or the like, a different apparatus using the tethering function of the portable terminal can also use the service. Then, as mentioned above, when an owner of the different apparatus is different from an owner of the portable terminal, this causes a problem in terms of accounting or security, for example. Accordingly, it is necessary to implement control such as restriction of communication of the different apparatus using the tethering function of the portable terminal, as necessary, when the tethering function to the different apparatus is being provided by the portable terminal.

The present invention has been devised in view of the above-mentioned problem. One of objects of the present invention is to provide a communication terminal, a communication control apparatus, a communication system, a method, and a program capable of restricting communication of an apparatus different from the communication terminal and configured to perform communication to a network using a tethering function provided by the communication terminal.

According to one of aspects (aspect 1) related to the present invention, there is provided a communication terminal configured to provide a tethering function. The communication terminal comprises: a communication flow control unit configured to perform predetermined communication control for a different apparatus communicatively connected to the communication terminal and communicatively connected to a network using the tethering function provided by the communication terminal, the predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

According to another related aspect (aspect 2), there is provided a communication system comprising:

a communication terminal configured to provide a tethering function; and a different apparatus configured to be communicatively connected to the communication terminal and to be communicatively connected to a network using the tethering function provided by the communication terminal;

wherein the communication terminal performs predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

According to further another related aspect (aspect 3), there is provided a communication control apparatus configured to perform predetermined communication control for an apparatus different from a communication terminal configured to provide a tethering function, the different apparatus being configured to be communicatively connected to the communication terminal and to be communicatively connected to a network using the tethering function provided by the communication terminal, the predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

According to yet another related aspect (aspect 4), there is provided a communication control method for an apparatus different from a communication terminal configured to provide a tethering function, the different apparatus being configured to be communicatively connected to the communication terminal and to be communicatively connected to a network using the tethering function provided by the communication terminal, the communication control method comprising:

performing predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

Further, according to still another related aspect (aspect 5), there is provided a program for causing a computer constituting a communication terminal configured to provide a tethering function to execute processing of:

performing predetermined communication control for a different apparatus configured to be communicatively connected to the communication terminal and to be communicatively connected to a network using the tethering function provided by the communication terminal, the predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

Further, according to still another related aspect (aspect 6), there is provided a non-transitory machine readable medium (non-transitory machine readable medium) storing the program according to the above-mentioned aspect 4.

According to the present invention, appropriate control, such as restriction of communication of the different apparatus configured to perform the communication to the network using the tethering function provided by the communication terminal, can be implemented. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 3 is a table illustrating examples of control policies in the first exemplary embodiment.

FIG. 6 is a table illustrating examples of control policies in the third exemplary embodiment.

PREFERRED MODES

Figure 1:
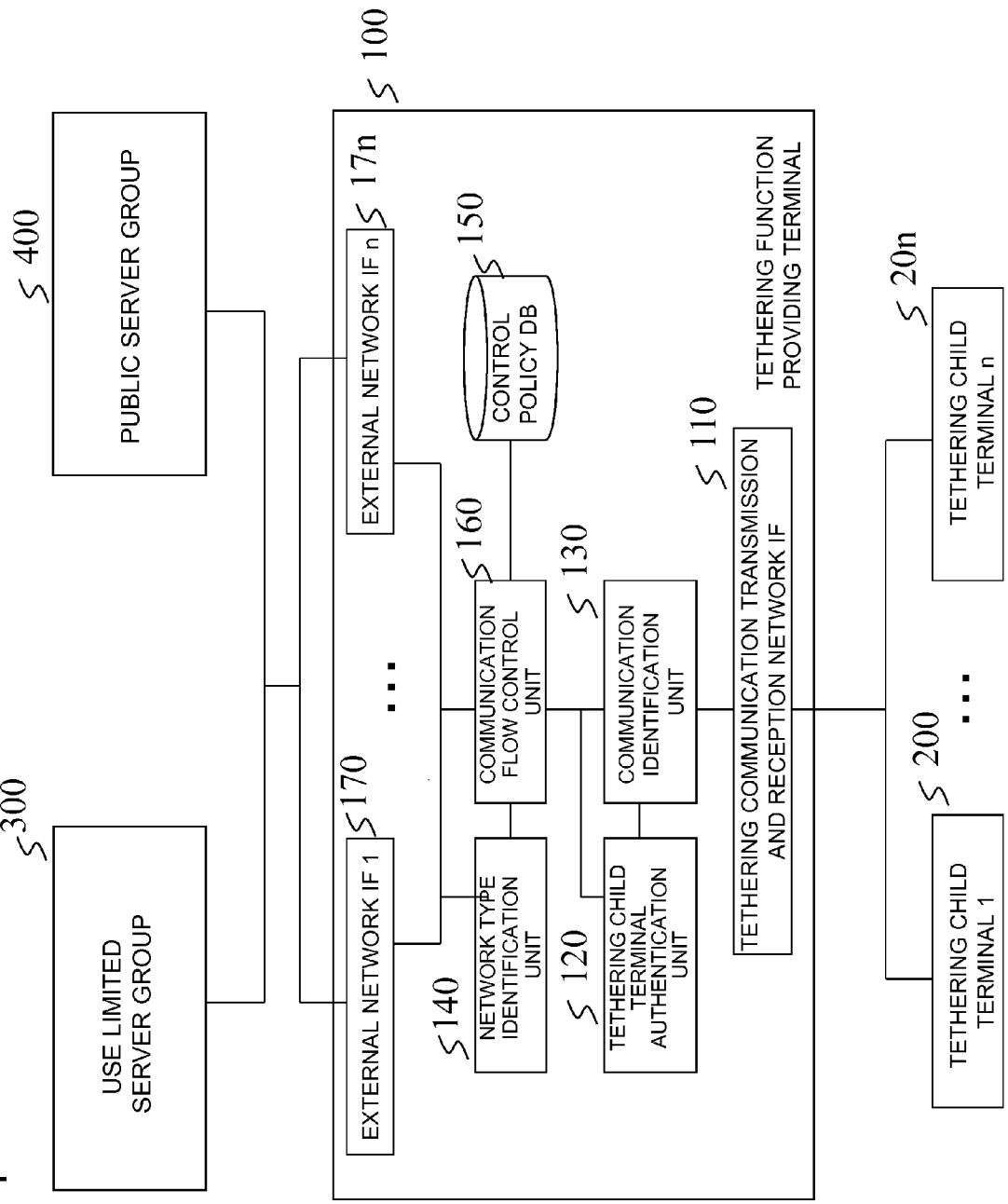
FIG. 1 is a diagram illustrating a configuration of a first exemplary embodiment.

Exemplary embodiments of the present invention will be described. According to one of preferred modes, referring to FIG. 7, a communication terminal (10) configured to provide a tethering function includes a communication flow control unit (11). The communication flow control unit (11) performs predetermined communication control for a different apparatus (20) configured to be communicatively connected to the communication terminal (10) and to be communicatively connected to a network (30) using the tethering function provided by the communication terminal (10). The predetermined communication control includes permission or blocking of communication of the different apparatus (20) using the tethering function provided by the communication terminal (10). The communication flow control unit (11) performs the predetermined communication control in accordance with a control policy (12) stored in a storage unit in advance, and based on at least one of:

attribute information of the different apparatus (20);

a communication destination of the different apparatus (20); and information on a network interface to which the communication terminal (10) is connected.

According to one of preferred modes, the communication terminal (10) may comprise an authentication unit (120 in FIG. 1) configured to perform authentication of the different apparatus (20) and to obtain the attribute information of the different apparatus (20). Alternatively, an external authentication unit (310 in FIG. 4) configured to be communicatively connected to the communication terminal (10) may perform authentication of the different apparatus (20), and the communication terminal (10) may then obtain from the external authentication unit (310) the attribute information of the different apparatus (20) obtained by the external authentication unit. The communication terminal (10) may comprise a communication identification unit (130 in FIG. 1) configured to identify the communication of the different apparatus (20) and to specify at least the communication destination, and a network identification unit (140 in FIG. 1) configured to identify the network to which the network interface is connected. Processing and function of the communication flow control unit (11) may be implemented by a program to be executed by a computer constituting the communication terminal (10).

Figure 7:
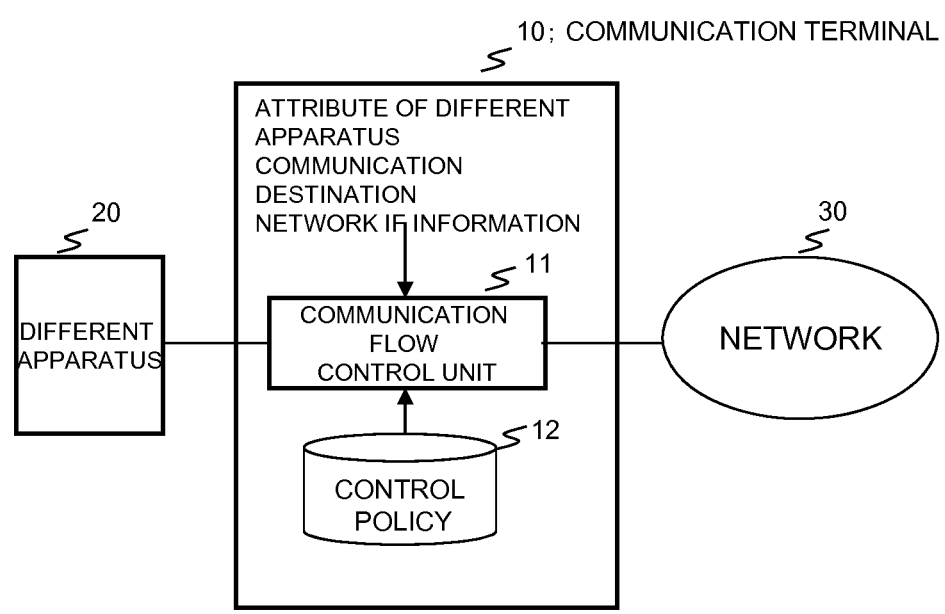
FIG. 7 is a diagram illustrating one of inventive concepts (technical concepts).

The communication terminal (10) in FIG. 7 in another mode may further comprise a communication amount measurement unit (180 in FIG. 5) configured to measure a cumulative total of a communication amount of the different apparatus (20). When control using a threshold value for the cumulative total value of the communication amount is defined in the control policy (12), in association with the communication destination of the different apparatus (20), the communication flow control unit (11) may perform control of the communication of the different apparatus (20), according to a magnitude relationship between the measured cumulative total value of the communication amount and the threshold value. The communication terminal (10) is connected to a wireless network, and is connected to an external packet data network through the wireless network, for example.

Alternatively, the communication flow control unit (11) may be set to a communication control apparatus. Then, for an apparatus (20) different from a communication terminal (10) and configured to be communicatively connected to the communication terminal (10) and to be communicatively connected to a network using a tethering function provided by the communication terminal (10) configured to provide the tethering function, the communication control apparatus may be configured to control permission or blocking of communication of the different apparatus (20) using the tethering function provided by the communication terminal (10), based on at least one of attribute information of the different apparatus (20), a communication destination of the different apparatus (20), and information on a type of a network interface to which the communication terminal (10) is connected, in accordance with a control policy (12) stored in a storage unit in advance.

The communication control apparatus may comprise an authentication unit configured to perform authentication of the different apparatus and to obtain the attribute information of the different apparatus. Alternatively, an external authentication unit with the communication terminal configured to be communicatively connected thereto may perform authentication of the different apparatus, and the communication control apparatus may obtain from the external authentication unit the attribute information of the different apparatus obtained by the external authentication unit.

The communication control apparatus may comprise a communication amount measurement unit configured to measure a cumulative total value of a communication amount of the different apparatus. When control using a threshold value for the cumulative total value of the communication amount is defined in the control policy, in association with the communication destination of the different apparatus, the communication control apparatus may control permission or blocking of the communication of the different apparatus, according to a magnitude relationship between the measured cumulative total value of the communication amount and the threshold value.

A system (such as an OpenFlow system) configuration may be adopted in which there are provided:

a switch configured to process an input packet according to a processing rule set by a controller; and the controller configured to generate a processing rule associated with a calculated flow and to set the processing rule in the switch, the controller including the communication control apparatus.

As a method according to another mode, there is provided a method for an apparatus different from a communication terminal configured to provide a tethering function, the different apparatus being configured to be communicatively connected to the communication terminal and to be communicatively connected to a network using the tethering function provided by the communication terminal. The communication control method comprises:

performing predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance.

The communication terminal (such as a portable terminal) configured to provide the tethering function is referred to as a "tethering function providing terminal". The tethering function providing terminal comprises the portable terminal such as a smart phone. A terminal connected to the tethering function providing terminal configured to provide the tethering function to use the tethering function ("different apparatus" such as a PC or a game apparatus) is referred to as a "tethering child terminal".

In preferred modes, the tethering function providing terminal (100 in FIG. 1) includes a tethering child terminal authentication unit (tethering child terminal authentication unit 120 in FIG. 1) configured to perform authentication of each of tethering child terminals (200 to 20*n*), a communication identification unit (communication identification unit 130 in FIG. 1) configured to identify communication of each tethering child terminal from among the tethering child terminals (e.g., n tethering child terminals in FIGS. 1: 200 to 20*n*) connected to the tethering function providing terminal (100), a network type identification unit (network type identification unit 140 in FIG. 1) configured to identify one or more types of networks (one or more types of network interfaces in FIG. 1) to which the tethering function providing terminal (100) is connected, and a communication flow control unit (communication flow control unit 160 in FIG. 1) configured to control communication of each of the tethering child terminals (200 to 20*n*) based on a result of authentication of each of the tethering child terminals (200 to 20*n*) and the one or more types of the networks to which the tethering function providing terminal (100) is connected. The communication flow control unit 160 and a control policy stored in a control policy database (DB) 150 respectively correspond to the communication flow control unit 11 and the control policy 12 in FIG. 7.

In preferred modes, each of the above-mentioned units operates as follows. The tethering child terminal authentication unit (120) of the tethering function providing terminal (100) performs authentication of each of the tethering child terminals (200 to 20*n*) that is connected to the tethering function providing terminal (100) and uses the tethering function, thereby identifying a usage right for each terminal of the tethering child terminals (200 to 20*n*).

The communication identification unit (130) of the tethering function providing terminal (100) identifies from which tethering child terminal (source node) communication of each of the tethering child terminals (200 to 20*n*) that performs the communication to an external network (Internet) through the tethering function providing terminal (100) comes, and identifies a destination (destination node) of the communication.

The network type identification unit (140) identifies a type of the wireless network to which the tethering function providing terminal (100) is connected.

The communication flow control unit (160) performs communication control such as:
  permission of each communication;
  blocking of the communication; or
  allocation of the communication,
according to:
  a usage right of the tethering child terminal;
  a type of the wireless network to which the tethering function providing terminal is connected; and
  a tethering child terminal of a communication source and a communication destination of each communication, identified and determined by the tethering child terminal authentication unit (120), the communication identification unit (130), and the network type identification unit (140).

As a result, in the tethering function providing terminal (100), the communication flow control unit (160) can perform optimal communication control in view of:
  communication security;
  a countermeasure against information leakage, and so on, on a per-communication basis of each tethering child terminal, according to a combination of:
  a usage right of the tethering child terminal;
  a communication destination of the tethering child terminal; and
  a type of the wireless network to which the tethering function providing terminal is connected, for example. Exemplary embodiments will be described below with reference to the drawings.

First Exemplary Embodiment

Referring to FIG. 1, a first exemplary embodiment includes a tethering function providing terminal 100, (n+1) number of tethering child terminals 200 to 20*n* (n being a predetermined non-negative integer), a use limited server group 300, and a public server group 400.

The tethering function providing terminal 100 is connected to each of the tethering child terminals 200 to 20*n* by wired or wireless communication means. The tethering function providing terminal 100 and each of the use limited server group 300, and the public server group 400 are connected by one or a plurality of types of wireless communication means.

The tethering function providing terminal 100 includes a tethering communication transmission and reception network IF (interface) 110, tethering child terminal authentication unit 120, communication identification unit 130, network type identification unit 140, a control policy database (DB) 150, communication flow control unit 160, and external network IFs 170 to 17*n*. Each of these units generally operates as follows.

Each of the tethering child terminals 200 to 20*n* is connected to the tethering function providing terminal 100 through the tethering communication transmission and reception network IF 110 using the wired or wireless communication means. Each of the tethering child terminals 200 to 20*n* performs communication with a service provided by the use limited server group 300 or the public server group 400 through one of the external network IFs 170 to 17*n* of the tethering function providing terminal 100.

In that case, the tethering child terminal authentication unit 120 performs authentication of each of the tethering child terminals 200 to 20*n* that is connected to the tethering function providing terminal 100 and uses a tethering function, thereby identifying a usage right for each of the tethering child terminals.

The communication identification unit 130 identifies from which tethering child terminal each communication of each of the tethering child terminals 200 to 20*n* that performs communication with the use limited server group 300 or the public server group 400 through the tethering function providing terminal 100 comes, and identifies a destination of each communication.

The network type identification unit 140 identifies one or more types of wireless networks to which each of the external network IFs 170 to 17*n* of the tethering function providing terminal 100 is connected.

In accordance with a control policy stored in the control policy database 150, the communication flow control unit 160 performs communication control such as:
  permission of the communication;
  blocking of the communication; or
  path allocation of assigning one of the external network IFs through which the communication is performed, according to the following data identified and determined by the unit 120, 130, and 140:
  a usage right of the tethering child terminal;
  the tethering child terminal of a communication source and a communication destination of each communication; and a type of the wireless network to which each external network IF on the tethering function providing terminal 100 is connected.

Though no particular limitation is imposed, as an example of the tethering function providing terminal 100, a portable terminal such as a smart phone is employed. The portable terminal includes the external network IFs 170 to 17n such as:

mobile public wireless communication means for 3G, LTE, or the like;

local area wireless communication means for a wireless LAN or the like;

short-distance wireless communication means for BluTooth (registered trade mark) or the like; or wired communication means using USB (Universal Serial Bus) connection or the like.

Connection between the tethering function providing terminal 100 and the tethering child terminals 200 to 20n is performed using one of the external networks IFs included by the tethering function providing terminal 100. For convenience, the external network IF used for connecting the tethering function providing terminal 100 and the tethering child terminals 200 to 20n is herein referred to as the tethering communication transmission and reception network IF 110.

As an example of a correspondence relationship among the wireless communication means and each of the external network IFs 170 to 170n and the tethering communication transmission and reception network 110 of the tethering function providing terminal 100 when each of the tethering child terminals 200 to 20n uses the tethering function provided by the tethering function providing terminal 100, the example as follows is used:

a wireless LAN is employed for the tethering communication transmission and reception network IF 100 used for communication with each of the tethering child terminals 200 to 20n; and 3G or LTE is employed for each of the external network IFs 170 to 170n used for communication between the tethering function providing terminal 100 and the use limited server group 300 or the public server group 400.

With this arrangement, each of the tethering child terminals 200 to 200n performs communication with the use limited server group 300 or the public server group 400 through the tethering function providing terminal 100. It is as a matter of course that correspondence among the wireless communication means, each of the external network IFs 170 to 170n, and the tethering communication transmission and reception network IF 110 is not limited to the above-mentioned correspondence. It may be so configured that communication between the tethering function providing terminal 100 and the use limited server group 300 or the public server group 400 is performed using a plurality of types of the external network IFs 170 to 170n, such as two types of 3G and the wireless LAN.

Alternatively, it may be so arranged that a VPN (Virtual Private Network) created on a segment for wireless communication using 3G, LTE, or the wireless LAN is handled as a type of the external network IF different from the external network IFs for 3G or LTE, and the wireless LAN, and may be employed for communication between the tethering function providing terminal 100 and the use limited server group 300 or the public server group 400.

As an example of the use limited server group 300, the following servers, for example, can be pointed out:

a moving picture distribution server configured to provide a service to paying members alone;

an enterprise business server whose use is limited to enterprise employees alone, and so on.

The use limited server group 300 may be installed on the common Internet or may be installed within a dedicated network in an enterprise.

As an example of the public server group 400, there is provided a general information providing server configured to release a service without limiting the user of the public server group 400 in particular. The general information providing server is installed on the common Internet.

Figure 2:
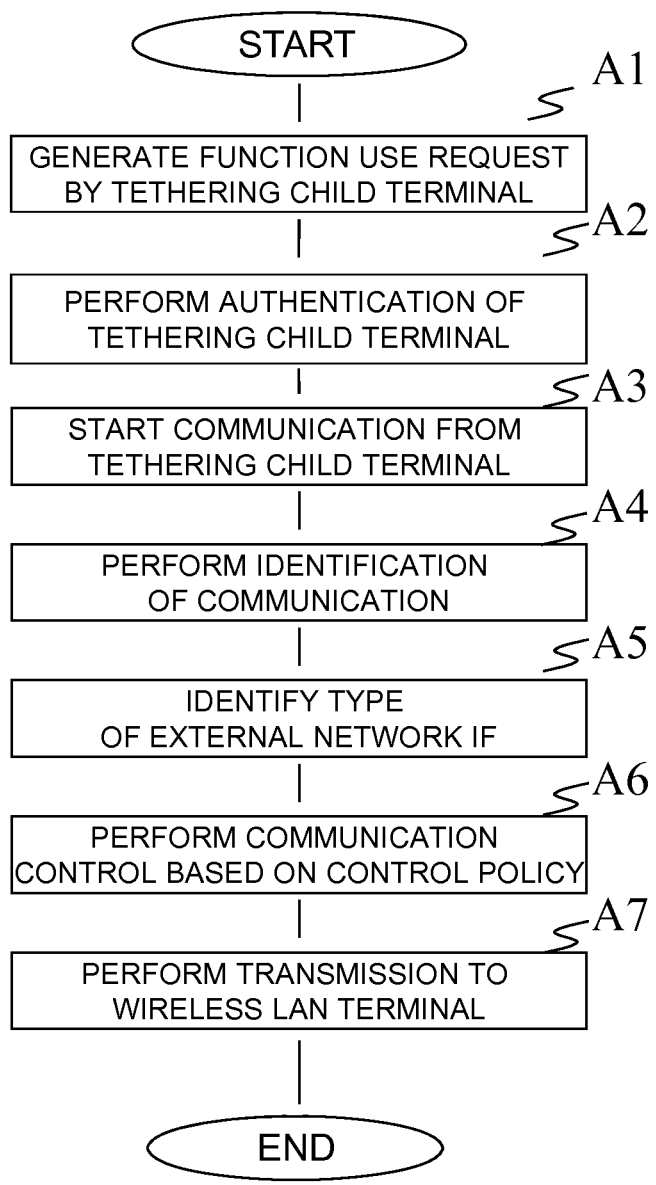
FIG. 2 is a flowchart for explaining operations of the first exemplary embodiment.

FIG. 2 is a flow diagram illustrating operation of the first exemplary embodiment. The following describes overall operation of this exemplary embodiment, with reference to FIG. 1 and the flowchart in FIG. 2.

One of the tethering child terminals 200 to 20n makes a tethering function use request to the tethering function providing terminal 100 (in step A1 in FIG. 2).

When the tethering function use request is made from the one of the tethering child terminal 200 to 20n through the tethering communication transmission and reception network IF 110, the tethering function providing terminal 100 performs authorization of the one of the tethering child terminals by the tethering child terminal authentication unit 120 to identify attribute information of the one of the tethering child terminals 200 to 20n (in step A2 in FIG. 2). As an example of the attribute information of the one of the tethering child terminals 200 to 20n identified in step A2 in FIG. 2, right information associated with use of the use limited server group 300 can be pointed out. Specifically, attribute information indicating the following may be used:

whether or not the user of the tethering child terminal is the paying member of the certain service; or whether or not the user of the tethering child terminal is the employee of the enterprise.

Alternatively, as an example of the attribute information of the one of the tethering child terminals 200 to 20n, attribute information indicating the following may be used:

whether the tethering child terminal is a terminal supplied by the enterprise;

whether the tethering child terminal is a personal terminal held by the employee; or whether the tethering child terminal is a terminal other than the above-mentioned terminals.

Next, when communication is performed to the use limited server group 300 or the public server group 400 from the one of the tethering child terminal 200 to 20n, the communication is performed from the one of the tethering child terminals 200 to 20n to the tethering communication transmission and reception network IF 110 of the tethering function providing terminal 100 (in step A3 in FIG. 2).

The communication identification unit 130 of the tethering function providing terminal 100 performs identification of the communication (in step A4 in FIG. 2).

As an example of content of the identification to be executed by the communication identification unit 130, the communication identification unit 130 identifies which one of the tethering child terminals 200 to 20n is the source of the communication.

The destination of the communication is included in one of the use limited server group 300 and the public server group 400. As an example of the destination of the communication, there is provided an IP (Internet Protocol) address, a URL (Uniform Resource Locator), or the like. The communication identification unit 130 identifies in which one of the use limited server group 300 or the public server group 400 the destination of the communication indicated by one of these data is included.

Next, the network type identification unit 140 identifies a type of the wireless network to which a corresponding one of the external network IFs 170 to 170-n of the tethering function providing terminal 100 is connected (in step A5 in FIG. 2).

As an example of each type to be identified by the network type identification unit 140, the following type can be specifically pointed out:
a type of the wireless network to which the corresponding one of the external network IFs 170 to 17n is connected, more specifically, 3G, LTE, a wireless LAN, VPN, or the like.

As an example of a type to be identified by the network type identification unit 140, the following classification can be pointed out:
classification into low security strength, medium security strength, or high security strength, according to communication security strength, and
classification into within or outside a dedicated enterprise network.

As a procedure for classifying the communication security strength, ranking of low security strength, medium security strength, or high security strength, according to the following classification can be pointed out:
encryption strength used for communication;
whether or not provided a VPN connection;
whether or not through a public wireless access point; or
whether or not through a wireless access point installed in an enterprise.

Generally, it can be determined that processing without encryption and communication through a public wireless access point have a low security strength, and that VPN connection has a strong security strength.

According to the control policy stored in the control policy database 150, the communication flow control unit 160 performs communication control, based on the following information identified and determined by the tethering child terminal authentication unit 120, the communication identification unit 130, and the network type identification unit 140 (in steps A2, A4, and A5 in FIG. 2):
attribute information of the tethering child terminal;
the tethering child terminal of the communication source and the communication destination of the communication to be controlled; and
information on a type of a wireless network to which the external network IF on the tethering function providing terminal 100 is connected.

The communication flow control unit 160 performs the following communication control:
permission of the communication;
blocking of the communication; or
path allocation of assigning one of the external network IFs through which the communication is performed when permitting the communication (in step A6 in FIG. 2).

FIG. 3 is a table illustrating examples of control policies stored in the control policy database 150. The communication flow control unit 160 determines a control action associated with each attribute associated with communication to be controlled, based on these control policies.

It is assumed that the control policies stored in the control policy database 150 are designed by:
a terminal vendor;
an enterprise network manager;
a communication carrier, or the like, such that adequate security may be ensured for each combination of:
an attribute of each tethering child terminal;
a communication destination; and
a communication path to which each of the external network IFs 170 to 170n is connected. That is, when a communication destination is an enterprise business server or a member-limited fee-based service, it is necessary for a tethering child terminal that uses this server or service to have a necessary usage right. Security of a communication path also needs to be high. On the other hand, when a communication destination is a service open to the public, no special right to be held by a tethering child terminal and no special security of the communication path are not necessary.

A description will be given about an example where communication control is performed for using an enterprise business system by a tethering child terminal based on the exemplary embodiment of the present invention.

In the case wherein the following settings are made:
the attribute of the tethering child terminal of a communication source of communication to be controlled is a terminal supplied by an enterprise,
a communication destination is the use limited server group 300, and
the external network IFs to which the tethering function providing terminal 100 is currently connected are for 3G, a public Wi-Fi(registered trademark) (Wireless Fidelity), and a VPN connected to the use limited server group 300, the communication flow control unit 160 refers to the control policies stored in the control policy database 150 to select, out of the external network IFs that are usable, the external network IF having a highest communication security (high security in FIG. 3) for which the communication is permitted. Referring to the examples of the control policies in FIG. 3, the external network IFs for which the communication is permitted provide connections to 3G and VPN. A VPN connected to the use limited server group 300 has a high communication security. Thus, the communication flow control unit 160 permits the communication through connection to the VPN. This selection is made because the terminal of the communication source has an adequate usage right and the communication path is also secure.

As another example, assume a case where the following settings are made:
an attribute of a tethering child terminal of a communication source of communication to be controlled is a personal terminal,
a communication destination is the use limited server group 300, and
the external network IFs to which the tethering function providing terminal 100 is currently connected are for 3G and the public Wi-Fi alone. Then, the communication flow control unit 160 blocks the communication, as a control action. This action is taken because the right to use the use limited server group 300 by the terminal of the communication source and the communication paths through the external networks IF do not have adequate security.

In the first exemplary embodiment, each of the tethering child terminals 200 to 20n that is connected to the tethering function providing terminal 100 and uses the tethering function is authenticated by the tethering child terminal authentication unit 120, thereby checking a usage right. Then, with respect to each communication by one of the tethering child terminals 200 to 20n that performs communication to the use limited server group 300 or the public server group 400 through the tethering function providing terminal 100, the communication identification unit 130 identifies:

from which tethering child terminal the communication comes; and a destination of the communication. Further, the network type identification unit 140 identifies a type of a wireless network to which a corresponding one of the external network IFs 170 to 170-n of the tethering function providing terminal 100 is connected. Then, the communication flow control unit 160 collates these identification results with the control policy designed in terms of ensuring communication security, and operates to perform communication control.

According to the first exemplary embodiment, the communication control such as permission or blocking of each communication and selection of the wireless network to be used, which is optimal for ensuring the communication security, can be performed, according to:

a usage right of the tethering child terminal configured to perform communication through the tethering function providing terminal 100; and a communication security strength and a usage right required by the communication destination of the communication.

Second Exemplary Embodiment

Figure 4:
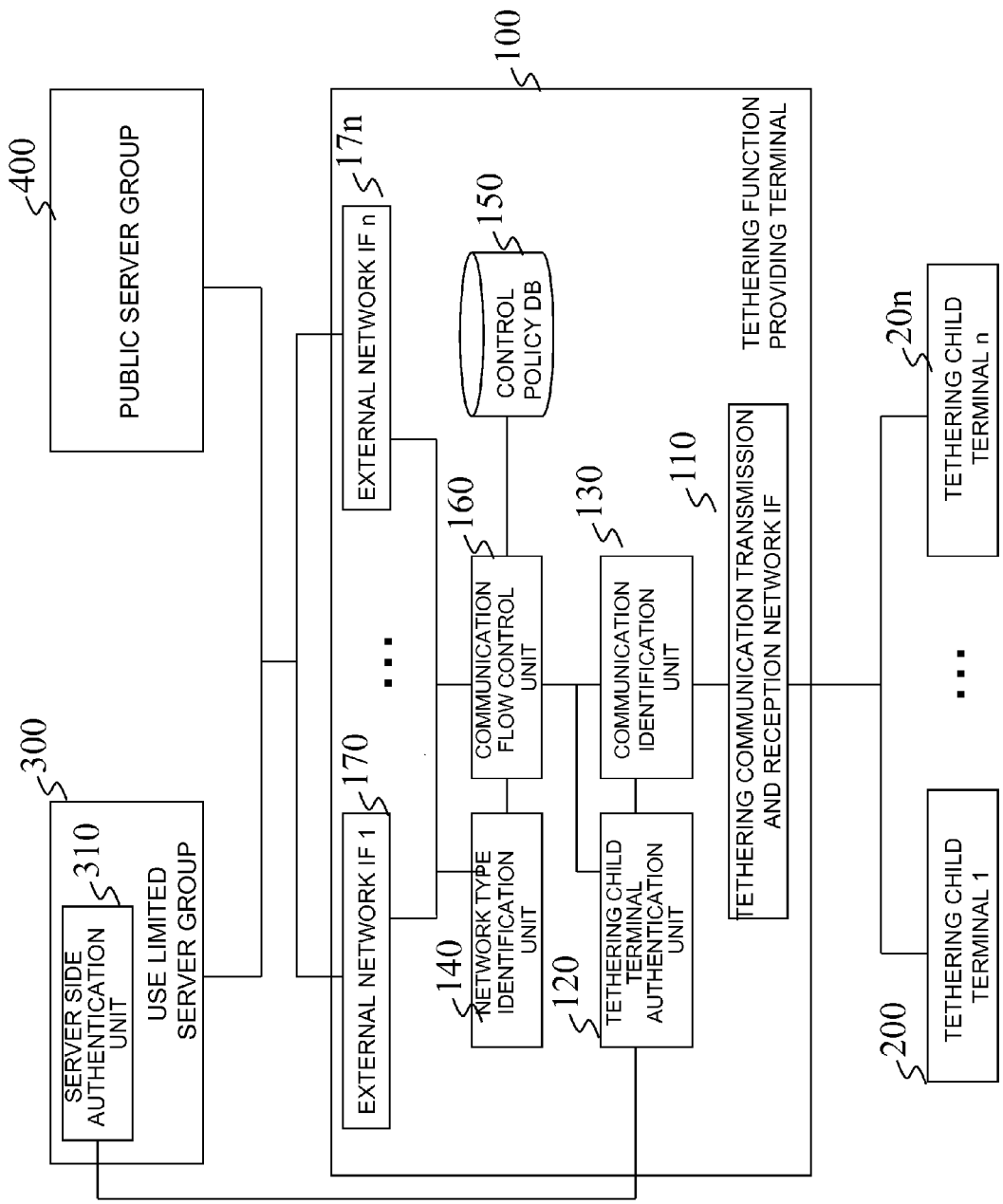
FIG. 4 is a diagram illustrating a configuration of a second exemplary embodiment.

FIG. 4 is a diagram illustrating a configuration of a second exemplary embodiment. Referring to FIG. 4, a difference between the configuration of the second exemplary embodiment and the configuration of the first embodiment is that server side authentication unit 310 is included in a use limited server group 300.

Operation of the second exemplary embodiment is different from that of the first exemplary embodiment, in that, when authentication of one of tethering child terminals 200 to 20n of a tethering function providing terminal 100 is performed, tethering child terminal authentication unit 120 on the tethering function providing terminal 100 and the server side authentication unit 310 cooperate to perform the authentication. As a specific example of a method of the cooperation, the tethering child terminal authentication unit 120 transfers all authentication processing to the server side authentication unit 310, and obtains a result of the authentication. Alternatively, the server side authentication unit 310 performs the authentication processing at an initial time, and stores and holds the result of the authentication in the tethering child terminal authentication unit 120, as cached data. When an authentication request is made from the same tethering child terminal after the initial time, this cached data is used. Since the other operations are the same as those of the first exemplary embodiment, the description of the other operations will be omitted in order to avoid duplication.

Third Exemplary Embodiment

Figure 5:
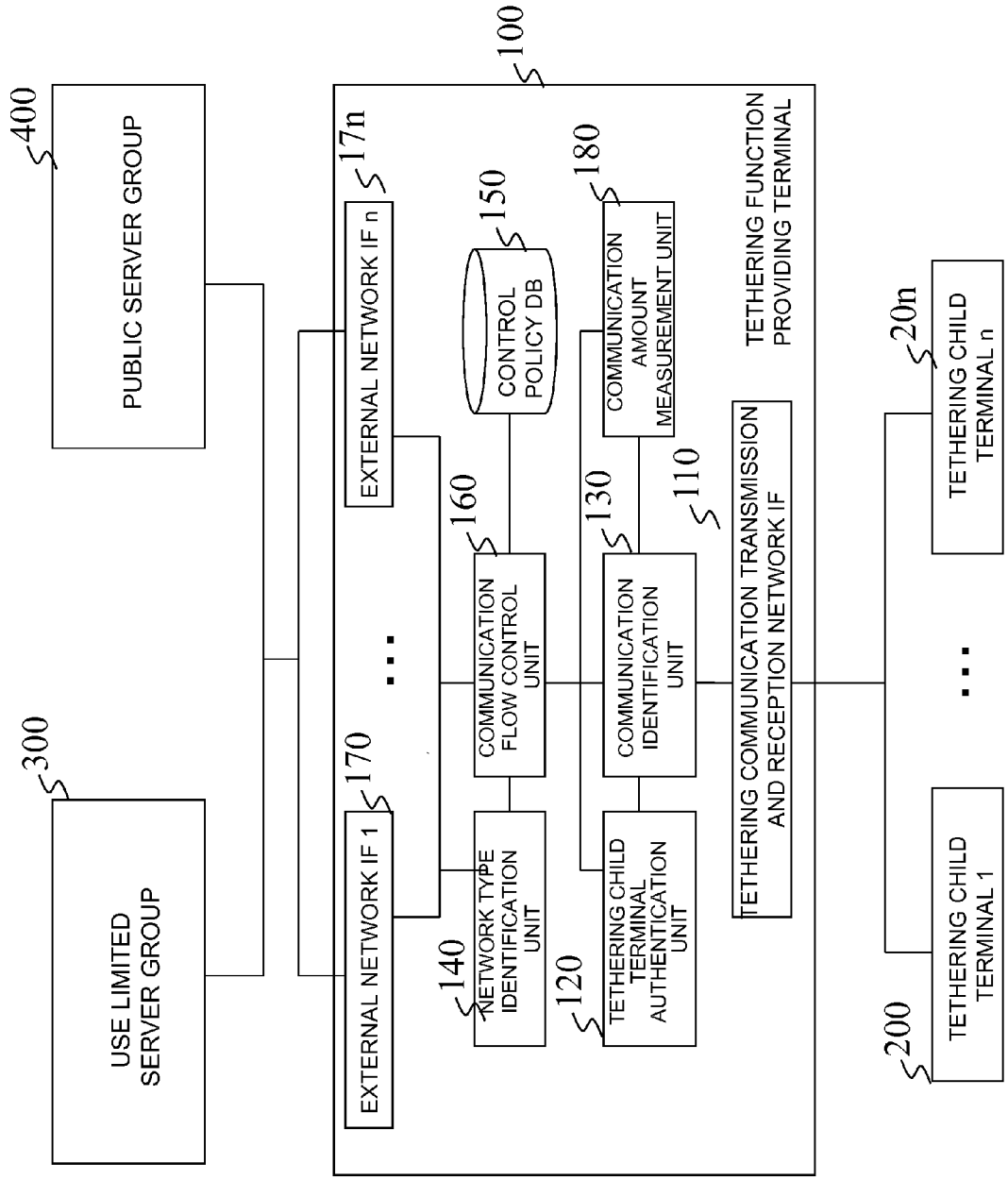
FIG. 5 is a diagram illustrating a configuration of a third exemplary embodiment.

FIG. 5 is a diagram illustrating a configuration of a third exemplary embodiment. Referring to FIG. 5, the configuration of the third exemplary embodiment is different from the configuration of the first exemplary embodiment in FIG. 1 in that a tethering function providing terminal 100 includes communication amount measurement unit 180.

A difference between operations of the third exemplary embodiment and the operations of the first exemplary embodiment will be described below. A description of the operations that are the same as those of the first exemplary embodiment will be omitted in order to avoid duplication.

During communication by one of tethering child terminals 200 to 20n through the tethering function providing terminal 100, the communication amount measurement unit 180 measures a cumulative amount of communication of the whole of the tethering child terminals. Communication flow control unit 160 performs communication control of the tethering child terminal in consideration of the communication amount measured by the communication amount measurement unit 180.

As an example of a procedure for measuring the communication amount by the communication amount measurement unit 180, the communication amount for each month, for example, is measured for each type of the external network IFs 170 to 170n, specifically, for each network type such as 3G and a wireless LAN.

FIG. 6 is a table illustrating examples of control policies stored in a control policy database 150 in the third exemplary embodiment illustrated in FIG. 5. As illustrated in FIG. 6, each control policy includes respective fields of:

an attribute of the tethering child terminal;

a communication destination;

an external network IF type;

a cumulative amount of communication; and a control action. The control action at a time of communication control is set to be changed according to a threshold value for the cumulative amount of communication (according to whether or not the cumulative amount of communication is equal to or less than the threshold value in the control, based on the threshold value). In the examples of the control policies in FIG. 6, as in a case where the type of the external interface IF is 3G, the communication control is changed for only a communication path for which a communication charge will be incurred, according to whether or not the cumulative amount of communication has exceeded the threshold value.

According to a magnitude relationship with the threshold value for the cumulative amount of communication, the control action for a terminal supplied by an enterprise is changed when:

a communication destination is a use limited server group 300; and a type of the external interface IF is 3G (under security), The control action for a personal terminal is changed when:

the communication destination is a public server group 400; and the type of the external interface IF is 3G (under security).

A description will be directed to a case where, with respect to these control policies, the tethering child terminal is a personal terminal and communication is performed to the public server group 400.

When the tethering function providing terminal 100 is connected to 3G and a public Wi-Fi(registered trademark), and when the cumulative amount of communication is equal to or less than the threshold value, both of the public Wi-Fi and 3G are permitted in terms of the control policies. Use of 3G communication, which has a higher security in terms of communication security is selected by the communication flow control unit 160.

When the cumulative amount of communication exceeds the threshold value, only the public Wi-Fi is permitted for communication in terms of the control policies. For this reason, use of the public Wi-Fi is selected by the communication flow control unit 160. With this arrangement, when using a network type for which accounting is performed according to the cumulative amount of communication, the communication flow control unit 160 can operate to change a network to be used from the network of that type to the network of a different type such as the public Wi-Fi when the cumulative amount of communication exceeds the certain value (threshold value).

In the third exemplary embodiment, the cumulative amount of communication is added to each control policy. However, the control policy can also be defined in terms of a usable communication band. As a specific example, the following is defined in the control policies:

when the cumulative amount of communication exceeds the threshold value as a result of measurement by the communication amount measurement unit 180, the Wi-Fi side having a large communication band is used, and the 3G side having a small communication band is blocked.

With this arrangement, an effect is achieved that the communication flow control unit 160 can be operated to select communication unit having a large communication band when a communication amount (cumulative amount of communication) is large.

Example

A description will be directed to an example where implementation is performed using OpenFlow (refer to the above-listed Non Patent Literatures 1 and 2, in addition to OpenFlow on the Internet (URL: http://www.openflowswitch.org) that is a network architecture of a centralized control type.

OpenFlow recognizes communications as end-to-end flows, and it is possible to perform path control or the like for each flow. The flow is a sequence of communication packets having a prescribed attribute identified based on the transmission source and the transmission destination of communication or the like. An OpenFlow switch (OpenFlow Switch: abbreviated as an "OFS") and an OpenFlow controller (OpenFlow Controller: abbreviated as an "OFC") are provided for path control for each flow by OpenFlow. The OFS is a network switch employing an OpenFlow technology. The OFS performs path control of a communication packet that passes through the OFS for each flow, according to a flow table set by the OFC. A flow entry that is each entry of the flow table includes, as an entry, a matching rule (Match Field) for being collated with information included in the header of the packet received by the OFS, an instruction (Actions: transmission of the packet from a specified port, flooding of the packet, discarding of the packet, etc.) which defines a processing method of the packet that matches the matching rule, and statistical information (Counters) such as the number of received packets (bytes). As the header information, an input port, a destination MAC (Media Access Control) address, a transmission source MAC address, an Ether Type (Ethernet (registered trademark) Type), a VLAN (Virtual Local Area Network) ID, a VLAN PCP (Priority Code Point), a destination IP address, a transmission source IP address, an IP protocol, a TOS (Type of Service), and a transmission source port number and a destination port number (e.g., TCP(Transmission Control Protocol)/UDP (User Datagram Protocol) port numbers) are included. When receiving the packet, the OFS refers to the flow table and retrieves the flow entry that matches the header information of the received packet.

When flow entry that matches the header information of the received packet is present in the flow table, OFS processes the received packet according to the instruction included in the entry that has matched the header information.

When entry flow that matches the header information of the received packet is not present in the flow table, OFS transmits the received packet to the OFC through a Packet In (Packet In) message using a secure channel, thereby requesting the OFC to set a flow entry that defines the method of processing the received packet.

The OFC calculates a forwarding path of the received packet based on network topology information, transmits to each OFS on the path a message (FlowModify) for setting the flow entry, and transmits a Packet Out (Packet Out) message that instructs forwarding of the packet to the relevant OFS on the path. The relevant OFS forwards the received packet according to the flow entry. By using the above-mentioned OpenFlow mechanism, the operations of communication identification unit 130 and communication flow control unit 160 in FIG. 1, for example, can be implemented. The communication identification unit 130 is implemented by the OFS, and the communication flow control unit 160 is implemented by the OFC. The communication identification unit 130 and the communication flow control unit 160 may be respectively implemented by a switch and a controller apparatus each configured with hardware, as an example. Alternatively, the communication identification unit 130 and the communication flow control unit 160 may be implemented by a switch and a controller software module each configured with software, as an example.

As a specific operation example, the communication identification unit 130 in FIG. 1 implemented by the OFS identifies a communication flow from the tethering child terminal in the communication identification process (in step A4) in the flowchart in FIG. 2, and obtains the destination IP address of the communication flow from information included in the header of the packet received by the OFS. Herein, identification of from which tethering child terminal the communication has been made may be performed using the information on the packet received by the OFS. Alternatively, identification of from which tethering child terminal the communication has been made may be performed by being linked to the authentication process in step A2 in the tethering communication transmission and reception network IF 110.

After the identification of the communication flow by the OFS, the communication flow control unit 160 in FIG. 1 implemented by the OFC, sets the flow table in the communication path allocation process (in step A6) in the flowchart in FIG. 2, based on the control policies stored in the control policy database 150. The communication flow control unit 160 thereby instructs path control for each communication flow for the OFS. Actual processing for the path control is performed by the OFS. An instruction comprising a control action described in the control policy and the type of the external network IF in that case, such as an instruction of outputting to the 3G IF side and blocking the Wi-Fi side, is described in the instruction included in this flow table.

As a procedure for setting the flow table in the communication identification unit 130 in FIG. 1 implemented by the OFS, using the communication flow control unit 160 in FIG. 1 implemented by the OFC, the communication flow control unit 160 may operate to set the flow table according to the control policy stored in the control policy database 150 in advance. Alternatively, when a request for setting a flow entry from the OFS is generated, the OFC may operate to search the control policy database 150 for the control policy that matches the header information of a corresponding communication flow, and to set the flow entry in the flow table of the OFS when the corresponding control policy is present.

Each exemplary embodiment and the example described above contributes to communication security and a countermeasure against information leakage at a portable terminal including a communication function configured to provide a tethering function to a different apparatus.

Each disclosure of the above-listed Patent Literatures and the above-listed Non-Patent Literatures is incorporated herein by reference. Modification and adjustment of each exemplary embodiment are possible within the scope of the overall disclosure (including the claims) of the present invention and based on the basic technical concept of the present invention. Various combinations and selections of various disclosed elements are possible within the scope of the overall disclosure of the present invention. That is, the present invention naturally includes various variations and modifications that could be made by those skilled in the art according to the overall disclosure including the claims and the technical concept.

What is claimed is:

1. A communication terminal configured to provide a tethering function, the communication terminal comprising:
   a first interface to communicatively connect to a different apparatus;
   one or more second interfaces to communicatively connect to a network;
   a communication flow control unit configured to perform predetermined communication control for the different apparatus communicatively connected to the communication terminal and communicatively connected to the network using the tethering function provided by the communication terminal,
   the predetermined communication control including permission or blocking of communication and path allocation of assigning the second interface through which the communication is performed when permitting the communication, for the different apparatus using the tethering function provided by the communication terminal, based on attribute information of the different apparatus, a communication destination of the different apparatus, and information on the second interface of the network to which the communication terminal is connected, in accordance with a control policy; and
   a storage that stores the control policy,
   wherein the control policy stored in the storage includes:
      an attribute field including one or more attributes of different apparatuses;
      a communication destination field including one or more communication destination server groups, in association with each attribute of the different terminal;
      a second interface type field including, in association with each communication destination server group, one or more second interface types respectively corresponding to one or more types of networks to which one or more second interfaces communicatively connect; and
      a control action field specifying permission or blocking of the communication, in association with each second interface type,
   the communication flow control unit searches the control policy stored in the storage, to find one or more control actions corresponding to the attribute of the different apparatus, the communication destination and one or more second interface types, and
   the communication flow control unit selects a second interface of the one or more second interfaces, based on a communication security strength associated with a type thereof, out of the one or more available second interfaces included in the communication terminal, with the control actions associated therewith indicating permission, while the communication flow control unit blocks communication of the different apparatus with the communication destination when the one or more control actions associated with one or more second interfaces included in the communication terminal each indicate blocking.

2. The communication terminal according to claim 1, comprising:
   an authentication unit configured to perform authentication of the different apparatus and to obtain the attribute information of the different apparatus.

3. The communication terminal according to claim 2, further comprising:
   a communication identification unit configured to identify the communication of the different apparatus and to specify at least the communication destination; and
   a network identification unit configured to identify the network to which the second interface is connected.

4. The communication terminal according to claim 1, wherein
   the communication terminal is communicatively connected to an authentication unit that is provided outside the communication terminal and performs authentication of the different apparatus, and
   the communication terminal obtains from the authentication unit the attribute information of the different apparatus obtained by the authentication unit.

5. The communication terminal according to claim 1, wherein the control policy stored in the storage includes:
   the communication destination field including, as the communication destination server groups, a use limited server group and a public server group, in association with each attribute of the different terminal, and
   the second interface type field including in association with each of the server groups, the second interface types respectively corresponding to public Wireless LAN, 3G, and VPN.

6. A communication terminal comprising:
   a first interface to communicatively connect to a different apparatus;
   a second interface to communicatively connect to a network;
   a communication flow control unit configured to perform predetermined communication control for the different apparatus communicatively connected to the communication terminal and communicatively connected to the network using the tethering function provided by the communication terminal, the predetermined communication control including permission or blocking of communication of the different apparatus using the tethering function provided by the communication terminal, based on at least one of attribute information of the different apparatus, a communication destination of the different apparatus, and information on the second interface of the network to which the communication terminal is connected, in accordance with a control policy stored in a storage unit in advance; and a communication amount measurement unit configured to measure a cumulative total value of a communication amount of the different apparatus, wherein when control using a threshold value for the cumulative total value of the communication amount is defined in the control policy, in association with the communication destination of the different apparatus and/or the network to which the communication terminal is connected, the communication flow control unit performs control of permission or blocking of the communication of the different apparatus using the tethering function provided by the communication terminal, according to a magnitude relationship between the cumulative total value of the communication amount measured by the communication amount measurement unit and the threshold value.

7. A communication system comprising:
a communication terminal configured to provide a tethering function; and
a different apparatus configured to be communicatively connected to the communication terminal and to be communicatively connected to a network using the tethering function provided by the communication terminal, wherein the communication terminal includes:
a communication flow control unit configured to perform predetermined communication control for the different apparatus, the predetermined communication control including permission or blocking of communication and path allocation of assigning a network interface through which a communication is performed when permitting the communication, for the different apparatus using the tethering function provided by the communication terminal, based on attribute information of the different apparatus, a communication destination of the different apparatus, and information on an interface of a network to which the communication terminal is connected, in accordance with a control policy; and
a storage that stores the control policy,
the control policy stored in the storage includes:
an attribute field including one or more attributes of different apparatuses;
a communication destination field including one or more communication destination server groups, in association with each attribute of the different terminal;
a network interface type field including, in association with each communication destination server group, one or more network interface types respectively corresponding to one or more types of networks to which one or more network interfaces included in the communication terminal communicatively connect; and
a control action field specifying permission or blocking of the communication, in association with each network interface type,
the communication flow control unit searches the control policy stored in the storage, to find one or more control actions corresponding to the attribute of the different apparatus, the communication destination and one or more network interface types, and
the communication flow control unit selects the network interface, based on a communication security strength associated with a type thereof, out of the one or more network interface interfaces included in the communication terminal, with the control actions associated therewith indicating permission, while the communication flow control unit blocks communication of the different apparatus with the communication destination when the one or more control actions associated with one or more network interfaces included in the communication terminal each indicate blocking.

8. The communication system according to claim 7, wherein the communication terminal further comprises
an authentication unit configured to perform authentication of the different apparatus and to obtain the attribute information of the different apparatus.

9. The communication system according to claim 7, comprising
an authentication unit that is provided outside the communication terminal and performs authentication of the different apparatus,
the communication terminal being communicatively connected to the authentication unit,
the communication terminal obtaining from the authentication unit the attribute information of the different apparatus obtained by the authentication unit.

10. The communication system according to claim 7, wherein the communication terminal further comprises:
a communication identification unit configured to identify the communication of the different apparatus and to specify at least the communication destination; and
a network identification unit configured to identify the network to which the interface is connected.

11. The communication system according to claim 7, wherein the control policy stored in the storage includes:
the communication destination field including, as the communication destination server groups, a use limited server group and a public server group, in association with each attribute of the different terminal, and
the second interface type field including in association with each of the server groups, the second interface types respectively corresponding to public Wireless LAN, 3G, and VPN.

12. A communication control apparatus configured to perform predetermined communication control for a different apparatus different from a communication terminal configured to provide a tethering function, the different apparatus being configured to be communicatively connected to the communication terminal and to be communicatively connected to a network using the tethering function provided by the communication terminal, the predetermined communication control including permission or blocking of communication and path allocation of assigning a network interface through which a communication is performed when permitting the communication, for the different apparatus using the tethering function provided by the communication terminal, based on attribute information of the different apparatus, a communication destination of the different apparatus, and information on an interface of a network to which the communication terminal is connected, in accordance with a control policy stored in a storage unit in advance,
wherein the control policy stored in the storage includes:
an attribute field including one or more attributes of different apparatuses;
a communication destination field including one or more communication destination server groups, in association with each attribute of the different terminal;
a network interface type field including, in association with each communication destination server group, one or more network interface types respectively corresponding to one or more types of networks to which one or more network interfaces included in the communication terminal communicatively connect; and a control action field specifying permission or blocking of the communication, in association with each network interface type, the communication flow control unit searches the control policy stored in the storage, to find one or more control actions corresponding to the attribute of the different apparatus, the communication destination and one or more network interface types, and the communication flow control unit selects the network interface, based on a communication security strength associated with a type thereof, out of the one or more network interface interfaces included in the communication terminal, with the control actions associated therewith indicating permission, while the communication flow control unit blocks communication of the different apparatus with the communication destination when the one or more control actions associated with one or more network interfaces included in the communication terminal each indicate blocking.

13. A communication system comprising:
a switch configured to process an input packet according to a processing rule set by a controller; and
the controller configured to generate the processing rule associated with a calculated flow and to set the processing rule in the switch;
wherein the controller includes the communication control apparatus as set forth in claim 12.

14. A communication control apparatus configured to perform predetermined communication control for an apparatus different from a communication terminal configured to provide a tethering function, the different apparatus being configured to be communicatively connected to the communication terminal and to be communicatively connected to a network using the tethering function provided by the communication terminal, the predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance,
wherein the communication control apparatus further comprises a communication amount measurement unit configured to measure a cumulative total value of a communication amount of the different apparatus, and
when control using a threshold value for the cumulative total value of the communication amount is defined in the control policy, in association with the communication destination of the different apparatus and/or the network to which the communication terminal is connected, the communication control apparatus performs predetermined control including permission or blocking of the communication of the different apparatus, according to a magnitude relationship between the cumulative total value of the communication amount measured by the communication amount measurement unit and the threshold value.

15. A communication control method by a communication terminal configured to provide a tethering function for a different apparatus configured to be communicatively connected to the communication terminal and to be communicatively connected to a network using the tethering function provided by the communication terminal, the method comprising:
obtaining at least one of attribute information of the different apparatus, a communication destination of the different apparatus, and information on an interface of a network to which the communication terminal is connected; and
performing predetermined communication control including permission or blocking of communication and path allocation of assigning a network interface through which a communication is performed when permitting the communication, for the different apparatus using the tethering function provided by the communication terminal, based on the attribute information of the different apparatus, the communication destination of the different apparatus, and the information on an interface of a network to which the communication terminal is connected, in accordance with a control policy stored in a storage unit in advance,
wherein the control policy stored in the storage includes:
an attribute field including one or more attributes of different apparatuses;
a communication destination field including one or more communication destination server groups, in association with each attribute of the different terminal;
a network interface type field including, in association with each communication destination server group, one or more network interface types respectively corresponding to one or more types of networks to which one or more network interfaces included in the communication terminal communicatively connect; and
a control action field specifying permission or blocking of the communication, in association with each network interface type, and
the method further comprises:
searching the control policy stored in the storage, to find one or more control actions corresponding to the attribute of the different apparatus, the communication destination and one or more network interface types, and
selecting the network interface, based on a communication security strength associated with a type thereof, out of the one or more network interface interfaces included in the communication terminal, with the control actions associated therewith indicating permission, while blocking communication of the different apparatus with the communication destination when the one or more control actions associated with one or more network interfaces included in the communication terminal each indicate blocking.

16. The communication control method according to claim 15, further comprising:
performing authentication of the different apparatus and to obtain the attribute information of the different apparatus.

17. The communication control method according to claim 15, further comprising:
identifying the communication of the different apparatus and specifying at least the communication destination; and
identifying the network to which the interface is connected.

18. A non-transitory computer readable recording medium storing a program for causing a computer constituting a communication terminal configured to provide a tethering function to execute processing comprising:
- obtaining at least one of attribute information of a different apparatus, a communication destination of the different apparatus, and information on an interface of a network to which the communication terminal is connected, the different apparatus configured to be communicatively connected to the communication terminal and to be communicatively connected to a network using the tethering function provided by the communication terminal; and
- performing predetermined communication control for the different apparatus, the predetermined communication control including permission or blocking of communication and path allocation of assigning the second interface through which a communication is performed when permitting the communication, for the different apparatus using the tethering function provided by the communication terminal, based on at least one of the attribute information of the different apparatus, the communication destination of the different apparatus, and the information on an interface of a network to which the communication terminal is connected, in accordance with a control policy stored in a storage unit in advance, wherein the control policy stored in the storage includes:
- an attribute field including one or more attributes of different apparatuses;
- a communication destination field including one or more communication destination server groups, in association with each attribute of the different terminal;
- a network interface type field including, in association with each communication destination server group, one or more network interface types respectively corresponding to one or more types of networks to which one or more network interfaces included in the communication terminal communicatively connect; and
- a control action field specifying permission or blocking of the communication, in association with each network interface type, and the processing further comprises:
- searching the control policy stored in the storage, to find one or more control actions corresponding to the attribute of the different apparatus, the communication destination and one or more network interface types, and
- selecting the network interface, based on a communication security strength associated with a type thereof, out of the one or more network interface interfaces included in the communication terminal, with the control actions associated therewith indicating permission, while blocking communication of the different apparatus with the communication destination when the one or more control actions associated with one or more network interfaces included in the communication terminal each indicate blocking.

19. A communication system comprising:
a communication terminal configured to provide a tethering function; and
a different apparatus configured to be communicatively connected to the communication terminal and to be communicatively connected to a network using the tethering function provided by the communication terminal, wherein the communication terminal includes:
- a communication flow control unit configured to perform predetermined communication control for the different apparatus, the predetermined communication control including permission or blocking of communication of the different apparatus using the tethering function provided by the communication terminal, based on at least one of attribute information of the different apparatus, a communication destination of the different apparatus, and information on an interface of a network to which the communication terminal is connected, in accordance with a control policy stored in a storage unit in advance; and
- a communication amount measurement unit configured to measure a cumulative total value of a communication amount of the different apparatus, and
- when control using a threshold value for the cumulative total value of the communication amount is defined in the control policy, in association with the communication destination of the different apparatus and/or the network to which the communication terminal is connected, the communication flow control unit performs control of permission or blocking of the communication of the different apparatus using the tethering function provided by the communication terminal, according to a magnitude relationship between the cumulative total value of the communication amount measured by the communication amount measurement unit and the threshold value.

20. A communication control method by a communication terminal configured to provide a tethering function for a different apparatus configured to be communicatively connected to the communication terminal and to be communicatively connected to a network using the tethering function provided by the communication terminal, the method comprising:
- obtaining at least one of attribute information of the different apparatus, a communication destination of the different apparatus, and information on an interface of a network to which the communication terminal is connected;
- performing predetermined communication control including permission or blocking of communication of the different apparatus using the tethering function provided by the communication terminal, based on at least one of the attribute information of the different apparatus, the communication destination of the different apparatus, and the information on an interface of a network to which the communication terminal is connected, in accordance with a control policy stored in a storage unit in advance;
- measuring a cumulative total value of a communication amount of the different apparatus; and
- when control using a threshold value for the cumulative total value of the communication amount is defined in the control policy, in association with the communication destination of the different apparatus and/or the network to which the communication terminal is connected, performing control of permission or blocking of the communication of the different apparatus using the tethering function provided by the communication terminal, according to a magnitude relationship between the cumulative total value of the communication amount and the threshold value.

\* \* \* \* \*